(No Model.)
3 Sheets—Sheet 1.

E. C. WORRELL.
COMBINED CULTIVATOR, PLANTER, AND FERTILIZER DISTRIBUTER.

No. 451,099. Patented Apr. 28, 1891.

WITNESSES:
Fred G. Dieterich
M. D. Blondel

INVENTOR:
E. C. Worrell,
BY
ATTORNEYS (No Model.) 3 Sheets—Sheet 2.
E. C. WORRELL.
COMBINED CULTIVATOR, PLANTER, AND FERTILIZER DISTRIBUTER.
No. 451,099. Patented Apr. 28, 1891.
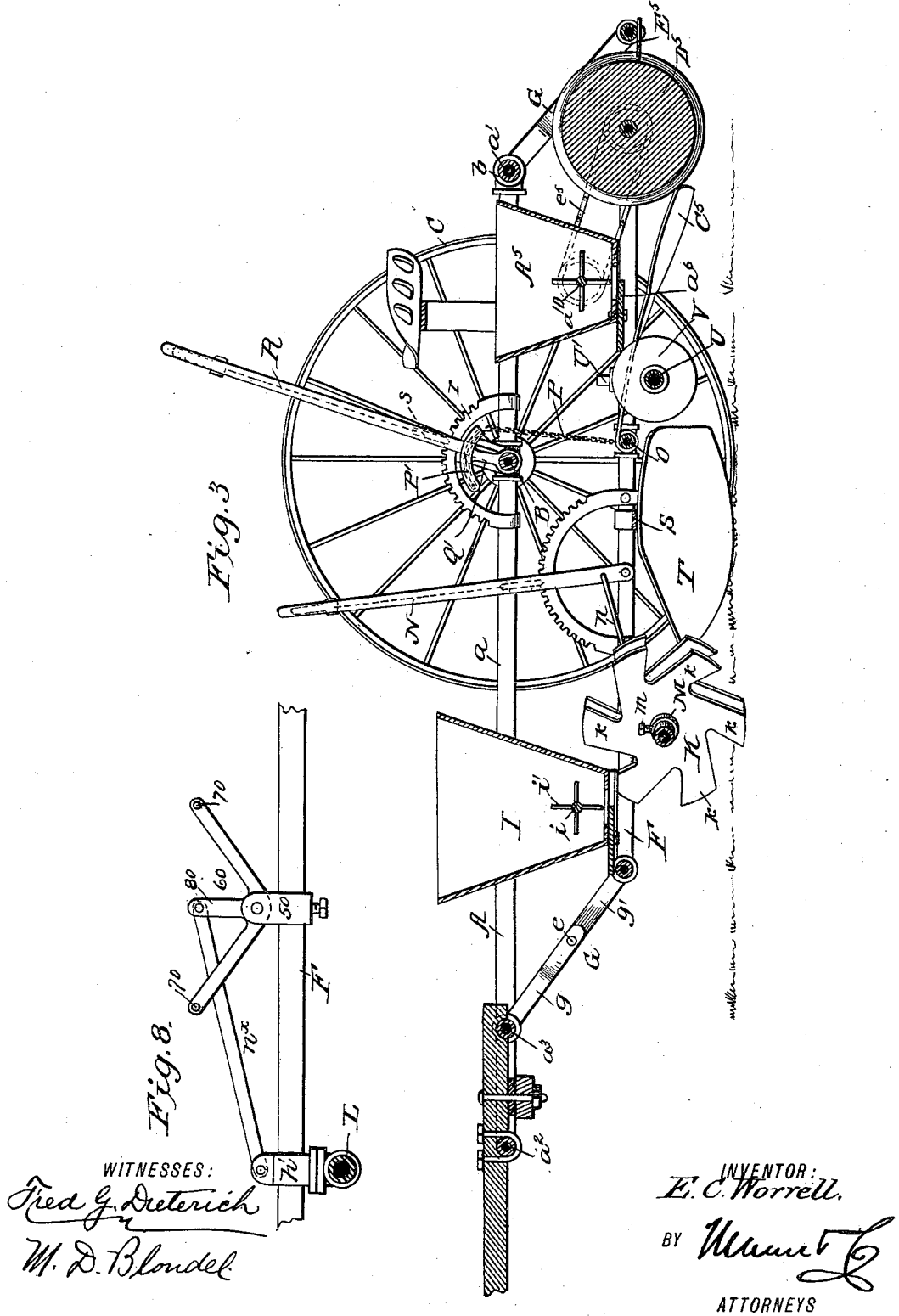

(No Model.) 3 Sheets—Sheet 3.
E. C. WORRELL.
COMBINED CULTIVATOR, PLANTER, AND FERTILIZER DISTRIBUTER.
No. 451,099. Patented Apr. 28, 1891.
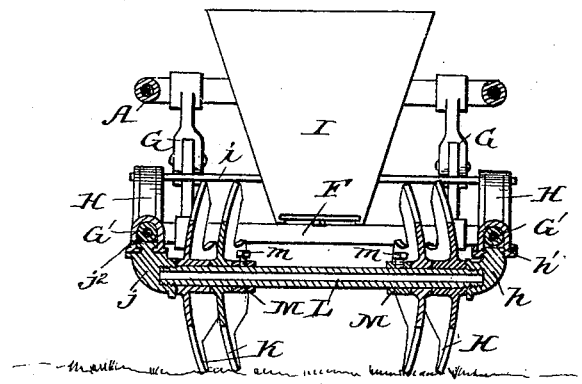
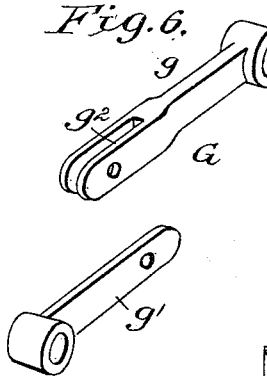
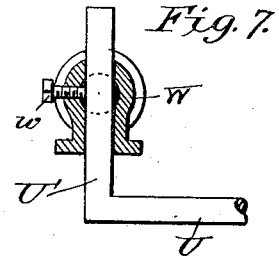
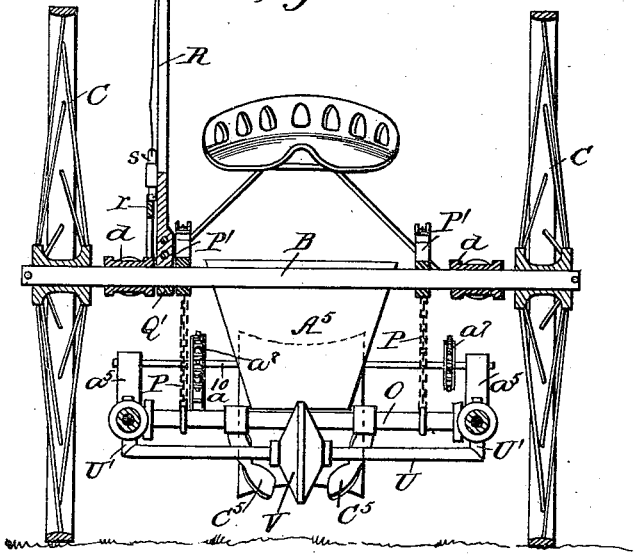
WITNESSES:
Fred G. Dieterich
M. D. Blondel
INVENTOR:
E. C. Worrell.
BY
ATTORNEYS

United States Patent Office.

EDWIN C. WORRELL, OF MURFREESBOROUGH, NORTH CAROLINA.

COMBINED CULTIVATOR, PLANTER, AND FERTILIZER-DISTRIBUTER.

SPECIFICATION forming part of Letters Patent No. 451,099, dated April 28, 1891.

Application filed June 26, 1890. Serial No. 356,901. (No model.)

*To all whom it may concern:*

Be it known that I, EDWIN C. WORRELL, residing at Murfreesborough, in the county of Hertford and State of North Carolina, have invented certain new and useful Improvements in a Combined Cultivator, Planter, and Fertilizer-Distributer, of which the following is a specification.

My invention is an improvement in that class of machines which are adapted for cultivating the ground, distributing the fertilizer, and planting the seed, and it is more especially adapted for cotton planting.

My invention has for its object to provide a machine of this character which will be simple but strong in construction, easy to manipulate, and effective and positive in its desired operation.

To this end my invention consists in providing a rectangular frame formed of a series of sections of gas-pipe mounted upon the supporting-wheels and a supplemental frame hung to the main frame for vertical adjustment, said frame adapted to support the cultivating, fertilizing, and planting devices.

It also consists in providing pulverizing-disks below the fertilizing-hopper mounted on a shaft having a pivotal bearing at one end on the supplemental frame and adapted to be swung diagonally to the line of draft and providing means for swinging said shaft and disks, whereby the same will also act as a steering device for the machine.

My invention finally consists in the peculiar combination and novel arrangement of the several parts, all of which will hereinafter be specifically referred to in the annexed specification, and be particularly pointed out in the claims, reference being had to the accompanying drawings, in which—

Figure 1:
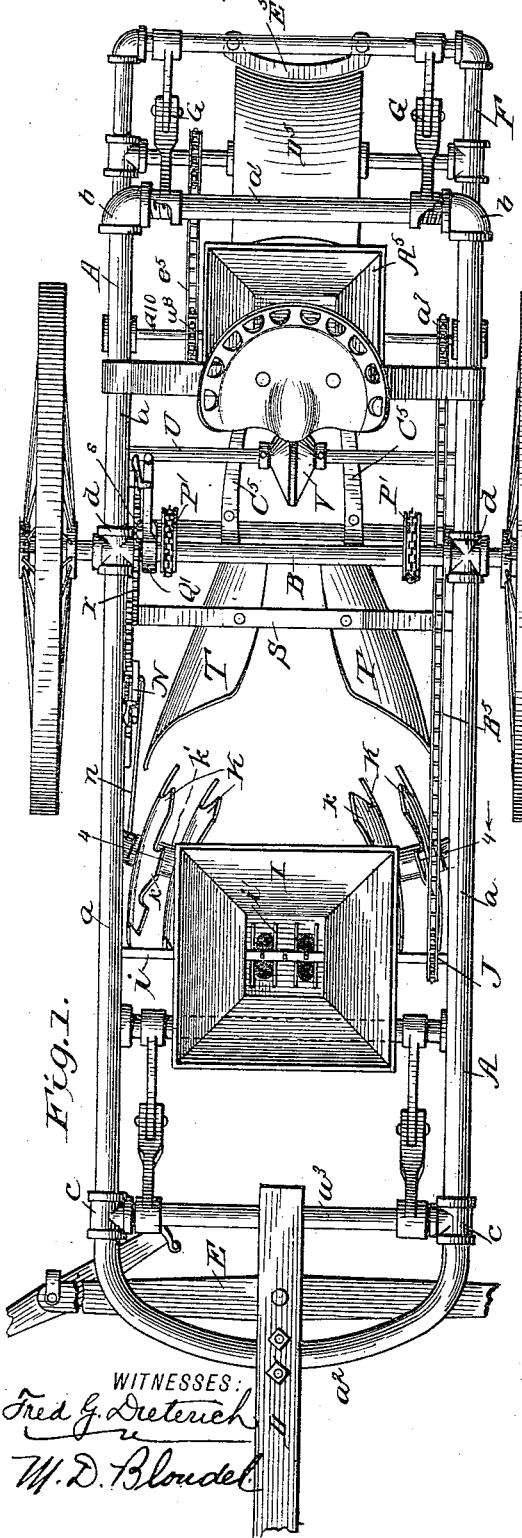
Figure 2:
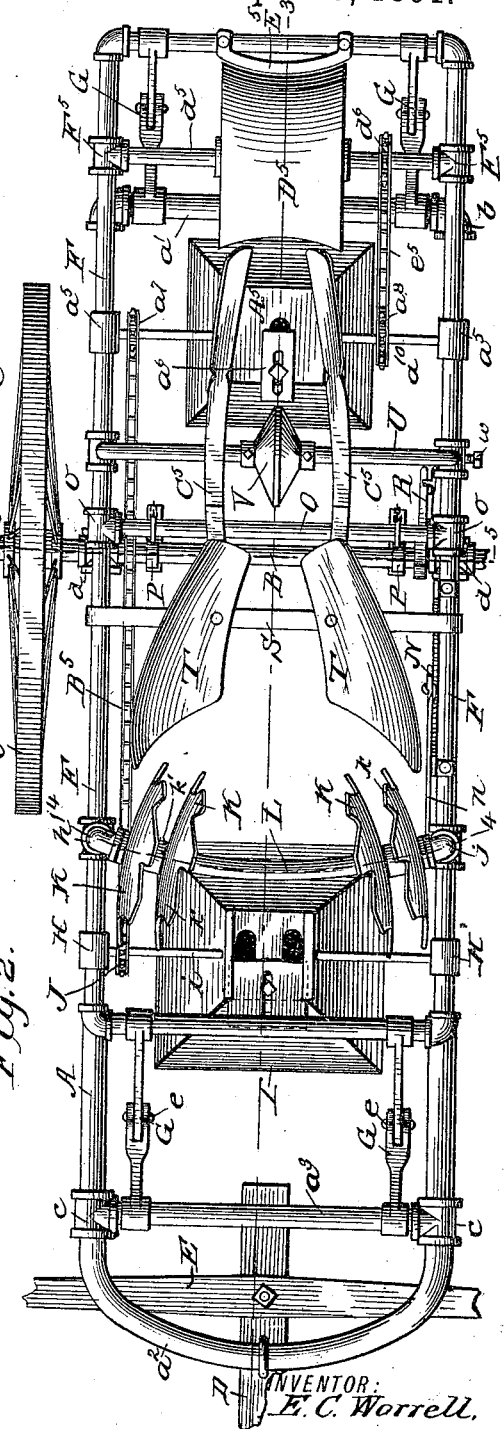

Figure 1 is a top plan view of my combined cultivator, fertilizer, and planter. Fig. 2 is a bottom plan view of the same. Fig. 3 is a vertical longitudinal section of the same on the line 3 3, Fig. 2. Fig. 4 is a transverse section of the same on the line 4 4, Fig. 2. Fig. 5 is a similar view on the line 5 5, Fig. 2. Fig. 6 is a detail perspective of one of the suspension-links. Fig. 7 is a detail section herein after referred to; and Fig. 8 is a view of a modification, showing means whereby the disk-shaft can be swung diagonally by foot-power.

In the accompanying drawings, A indicates the main frame, formed of a series of gas-pipe sections, the rear end section or bar $a'$ being connected to the sides $a$ by means of the elbow-joints $b\ b$, the ends of the pipe-section $a'$ being formed with right and left screw-threads, whereby said section may be readily attached or detached, as required. The front end $a^2$ is formed of a bowed section joined to the sides $a$ by means of the T-joints $c\ c$, as shown.

B indicates the axle, which is passed through the couplings $d\ d$, (see Fig. 5,) upon the outer ends of which are mounted the supporting-wheels C C.

D indicates the tongue, which is clipped to the front section $a^2$ and a cross-bar $a^3$, and E indicates the doubletree.

F indicates the supplemental frame, which is also formed of a series of pipe-tubing joined together, as shown, which is hung to the main frame in a manner most clearly shown in Figs. 1 and 3, by reference to which it will be seen that suspension-bars G are provided, which are connected at their lower ends to the frame F, while their upper ends are connected to frame A.

In the construction shown it will be seen that I form the bars G of two sections $g\ g'$, the upper one $g$ of which is slotted at $g^2$, in which the free end of the section $g'$ fits, said sections being held together by the pivot-bolt $e$. By this construction of the bars G the lower frame is adapted for free longitudinal movement and at the same time providing hanger-bars having a strong pivotal connection not easily broken by lateral strain.

Upon suitably-arranged brackets H, held upon the side bars G' G' of the frame F, is mounted the fertilizer-hopper I, which may be of any ordinary construction and which is provided with the usual stirrer-wheel $i$, mounted to turn in the bottom thereof, the shaft $i'$ of which projects beyond the sides of the hopper and is provided with a chain-wheel J.

At a point below and just in the rear of the fertilizing-hopper I is arranged a series of harrow-disks K, which serve to pulverize and mix the earth with the fertilizer as it is dropped from the hopper I.

By reference to Figs. 2 and 4, which show the arrangement of the disks K most clearly, it will be seen that the same consist each of a concaved circular body formed with a series of radial cutting-blades $k$, held to rotate upon a bent shaft L, held from rotation and mounted on the frame F, said disks being each formed with or secured to a sleeve $k'$, which is slipped onto the shaft L and held from longitudinal movement thereon by means of the washers M and set-screws $m$.

Referring to Fig. 2, it will be seen that the blades are set in pairs, one pair to each side of the center, at an angle to the longitudinal axis of the machine and with their rear ends nearest each other, thereby serving not only to break and pulverize the ground, but also to throw the dirt so as to form a ridge. I also utilize the said disks as a means for steering the machine by adjusting the same at different angles to form a drag. For this purpose I join the shaft L to the sides G' by means of the coupling $j$ and the swivel-bearing $j^2$, which supports one end of the said shaft, while the opposite end thereof is supported in an elbow $h$, secured to a sleeve $h'$, held to slide upon the side bars G', as shown.

N denotes a lever pivoted to said side bar, with which is connected one end of a bar $n$, the other end of which is connected to the sleeve $h'$, the usual rack-segment and spring-latch being provided to hold said lever in adjusted position. By this arrangement the driver can readily adjust the sleeve $h'$ on the bar G', and thereby change the angle of the disks K, and thereby cause the same to drag the machine and turn it to the direction desired.

O indicates a cross-bar secured at its ends in T-couplings $o\ o$ on the frame F, to which are connected the lower ends of lifting-chains P P, the upper ends of which are passed over and connect to segmental projections P' P', fixedly held upon the axle B, upon which is also held a sleeve or socket-plate Q', into which is fitted the lower end of a lever R, pivoted upon main frame A and disposed within reach of the driver. By this arrangement the lower frame can be readily adjusted vertically and held in position when raised by means of the rack $r$ and spring-latch $s$.

Intermediate the cross-bar O and the disks K is arranged a saddle or support S, which is clipped to the side bars G' of the frame F, to which are attached the ridging-blades T, arranged as shown in Fig. 2, the front ends of which are curved, so they will readily travel over obstructions.

A short distance to the rear of the cross-bar O is disposed a transverse bar U, centrally of which is mounted an opener or disk V, which serves to make the furrow in the center of the ridge as it is formed by the ridging-blades T and to provide for a shallow or deep furrow, as may be desired. I arrange said disk V for vertical adjustment by connecting the bar U with the frame G' in the manner most clearly shown in Fig. 7 of the drawings, by reference to which it will be seen that I form the bar U with upturned ends U' U', which pass through the couplings W W and are held therein in their adjusted positions by means of set-screws $w\ w$, which pass through the upper ends of the couplings and bear against said ends U' U', as shown.

$A^5$ denotes the seed-hopper, which is mounted upon suitably-arranged brackets $a^5\ a^5$, secured to the frame F, said hopper being of any ordinary construction and provided with the usual stirrer shaft and wheel, which operates over the discharge-opening, the size of which is regulated by the adjustable slide $a^6$. The ends of the stirrer-shaft are projected beyond the sides of the seed-hopper and are provided with chain-wheels $a^7\ a^8$, one of which $a^7$ is connected by means of the chain $B^5$ with the chain-wheel J on the shaft $i$ of the fertilizer-distributing device.

By reference to Fig. 2 of the drawings it will be seen that the discharge-opening of the seed-hopper is just to the rear of the furrow-opener, so that the seed will as it drops from the hopper fall into the furrow made to receive it.

Extended rearward from the cross-bar O, one to each side of the furrow-opener, are arranged covering-blades $C^5\ C^5$, which turn the dirt into the furrow and cover same. At the end of said coverers $C^5\ C^5$ is arranged the covering and packing roller $D^5$, formed with a concaved face, which travels over the ridge and packs the dirt over the seed in the furrow. A scraping-blade $E^5$, secured to the rear cross-bar of the frame F, serves to clean the dirt from the roller as it revolves.

The roller $D^5$ is journaled in the T-couplings $F^5$, held on the sides G' of the frame F, the shaft $d^5$ thereof being provided with a chain-wheel $d^6$, which is connected by means of the chain $e^5$ with the wheel $a^8$ on the shaft $a^{10}$. By this construction it will be seen that as the frame F is lowered for operation and the roller $D^5$ revolves power will be applied to the stirrer-shaft of the seed-hopper and from it to the shaft in the fertilizer-distributer.

From the foregoing description, taken in connection with the drawings, the advantages of my improved machine will readily appear. By forming the frame of a series of pipe-sections arranged as shown and described the machine can be quickly taken apart or set up in a very short time, such construction also serving to render the machine very strong. It will also be seen that by supporting the lower frame on the upper frame, as shown, the same can be quickly raised and lowered, and by lifting the lower frame the roller $D^5$ will be free from contact with the ground and all motion to the seed-feeding and fertilizing devices will be stopped without the necessity of employing shifting-levers, clutches, and the like. By providing the disks K, as shown, the same will not only serve to pulverize the ground, but also lead it inward toward the ridging-blades, which in turn lead the dirt to the furrow-opener disposed just in advance of the seed-opening in the seed-box.

The machine is adapted for use on all kinds of soil, its construction requiring but the ordinary draft-power, while its capacity for cultivating, fertilizing, and planting is much greater than that of the machines now in general use.

When desired, the hand-lever N may be dispensed with and the device shown in Fig. 8 used instead, said device consisting of a stand 50, secured to frame F, to which is pivotally connected the lower end of a compound lever-bar 60, the oppositely-projecting ends of which are formed with foot-rests 70, as shown, said lever being also formed with an upright 80, to which is connected the inner end of the coupling-link $n^x$, the lower end of which connects with the sliding sleeve $h'$, to which the disk-shaft L is connected. By this means the driver can steer the machine with his feet and use both of his hands for guiding his team.

Having thus described my invention, what I claim, and desire to secure by Letters Patent, is—

1. In a machine of the character described, the combination, with the main frame, of a supplemental frame hung thereon for vertical adjustment, said frame adapted to carry the cultivating devices, a fertilizing-hopper mounted on the forward end thereof, a seed-hopper near the rear end, said hoppers formed with stirrers, the shafts thereof provided with drive-pulleys, chains or belts connecting said pulleys, a covering-wheel mounted on the rear end of said frame, a chain or belt connection between said wheel and the seed-stirrer shaft, whereby the fertilizer and seed dropping devices are operated, and means for raising said covering-roller from contact with the ground, substantially as shown, and for the purpose described.

2. In a machine of the character described, the combination, with the supplemental frame, the fertilizer-dropper mounted on the forward end thereof, and a series of pulverizing-disks K, journaled on said frame below the fertilizer-hopper, arranged in sets diagonally to the line of draft, of seeding devices located on said frame and the ridging-blades arranged one to each side of the center of the machine, said blades arranged diagonally to the line of draft approximately parallel with the pulverizing-disks, all combined substantially as and for the purpose described.

3. The combination, with the supplemental frame, of the transverse shaft L, having a pivotal connection with one of the side bars G' of said frame, its opposite end held to slide longitudinally on the opposite side bar G', a series of pulverizing-disks mounted to revolve on said transverse shaft, a lever N, pivoted on said frame, and a connection between said lever and the movable end of the transverse shaft L, whereby said disks can be thrown at an angle to the line of draft and cause the machine to drag and turn, all arranged substantially as and for the purpose described.

4. The combination, with the supplemental frame formed of a series of pipe-sections joined together and the vertically-apertured couplings W, adapted to join the front and rear sections of said frame together, of a transverse bar U, provided centrally thereof with a furrow-opener, said bar formed with upturned ends U' U', adapted to pass through the apertured couplings and be vertically adjustable therein, and means for holding said bar in adjusted positions, substantially as shown and described.

5. The hereinbefore-described improved combined cultivator, fertilizer-distributer, and planter, comprising a main frame, a supplemental frame hung from the main frame for vertical adjustment, means for holding same in adjusted positions, a fertilizer-distributer mounted on said frame, a series of revolving pulverizing-disks mounted below said distributer, ridging-plates located on the supplemental frame and to the rear of said disks, a furrow-opener disposed to the rear of the converged ends of the ridgers, seed-dropping devices held on the said supplemental frame to the rear of the furrow-opener, covering-arms extended to each side of the furrow-openers and beyond the seed-box, a covering-roller journaled to the rear end of said supplemental frame, the intermediate chain connections between said roller, the seed-droppers, and the fertilizer-distributer, and means for shifting the pulverizing-disks diagonally to the line of draft, substantially as and for the purpose described.

EDWIN C. WORRELL.

Witnesses:
R. W. WINBORNE,
G. W. GRIMES.